United States Patent Office 3,221,012
Patented Nov. 30, 1965

3,221,012
19-LOWER ALKYL-Δ⁴-10α-PREGNENE-3,20-DIONE AND DERIVATIVES THEREOF
Albert Bowers, Mexico City, Mexico, assignor to Syntex Corporation, Panama, Panama, a corporation of Panama
No Drawing. Filed Mar. 1, 1963, Ser. No. 262,236
20 Claims. (Cl. 260—239.55)

The present invention relates to novel cyclopentanophenanthrene compounds and to a process for the production thereof.

More particularly the present invention relates to novel 19-lower alkyl-Δ⁴-10α-pregnene-3,20-dione derivatives.

The novel compounds of the present invention are represented by the following formulae:

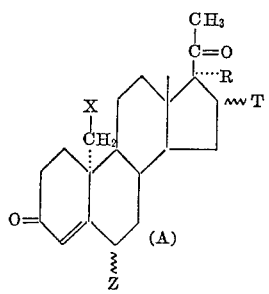
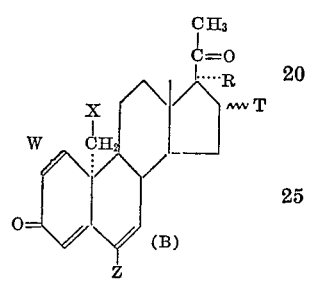

In the above formulae R represents hydrogen, hydroxyl or a hydrocarbon carboxylic acyloxy group of less than 12 carbon atoms, T represents hydrogen, α-hydroxy, α-methyl or β-methyl; T and R together represent the group

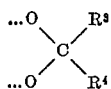

in the 16α,17α-position, wherein $R^3$ and $R^4$ each represent hydrogen or a hydrocarbon residue of up to 8 carbon atoms of straight, branched, saturated or unsaturated, cyclic or mixed aliphatic cyclic chain, or aromatic, such as methyl, ethyl, isopropyl, phenyl, toluyl, methylcyclohexyl and the like; Z represents hydrogen, methyl, chlorine or fluorine, all having α or β configurations in Formula A; W represents a double bond or a saturated linkage between C–1 and C–2; and X represents a lower alkyl group.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulae are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities. When applied topically, the compounds are very useful in the treatment of acne.

The novel compounds of the present invention are prepared by the process illustrated by the following scheme:

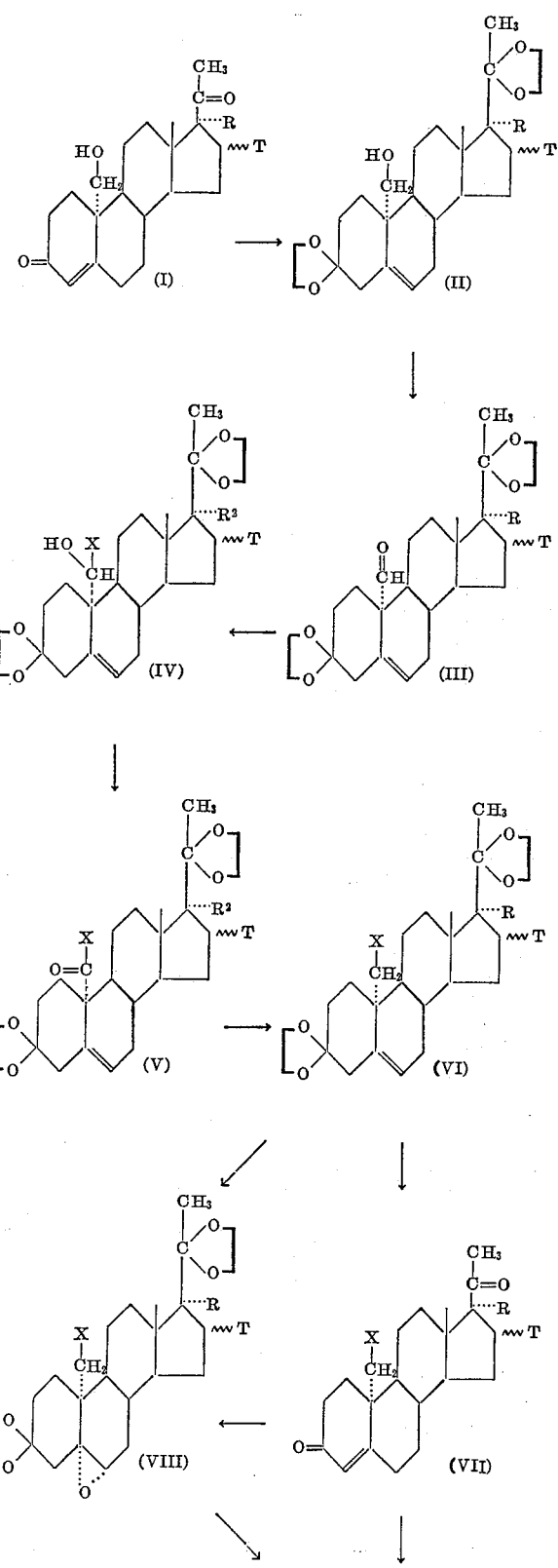

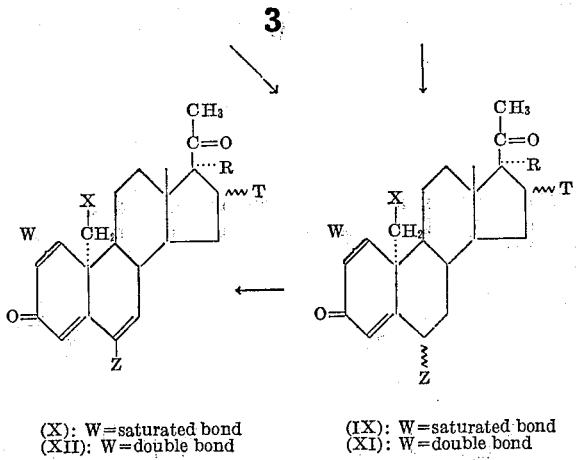

(X): W=saturated bond
(XII): W=double bond (IX): W=saturated bond
(XI): W=double bond In the above formulae R, T, W, X and Z have the same meaning as previously described; $R^2$ represents hydrogen or hydroxyl; and $R^2$ and T together represent the group

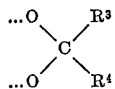

in the 16α,17α-position, wherein $R^3$ and $R^4$ have the same meaning as set forth hereinbefore.

The starting compound (I) of the present process, which is a $\Delta^4$-10α-pregnen-19-ol-3,20-dione derivative, is obtained according to Cross U.S. patent application Serial No. 231,831 filed October 19, 1962, from the corresponding $\Delta^4$-pregnen-19-ol-3,20-dione, by hydrogenation of the $\Delta^4$-double bond, tosylation of the resulting allopregnan-19-ol-3,20-dione; treatment of the obtained 19-tosylate with sodium hydride, hydrolysis of the resulting 2,19-cycloallopregnane-3,20-dione in a strong acid or basic medium and finally introduction of a $\Delta^4$-double bond into the obtained 10α-allopregnan-19-ol-3,20-dione by conventional procedures, i.e. successive treatment with bromine, sodium iodide and γ-collidine.

In practicing the process outlined above, the starting compound (I), upon reaction with ethyleneglycol in the presence of p-toluenesulfonic acid yields the corresponding 3,20-bis-cycloethylenedioxy-$\Delta^5$-10α-pregnen-19-ol derivative (II). The 19-hydroxyl group of the latter compound is oxidized in a neutral or slightly basic medium, preferably with chromium trioxide in pyridine, to give the corresponding 3,20 - bis-cycloethylenedioxy-$\Delta^5$-10α-pregnen-19-al compound (III), which upon treatment with a lower alkyl magnesium halide, such as methyl or ethyl magnesium bromide, or a lower alkyl lithium compound in a solvent inert to the reagent, such as benzene, affords the corresponding 3,20-bis-cycloethylenedioxy-19-lower alkyl-19-hydroxy-$\Delta^5$-10α-pregnene derivative (IV). The latter reaction hydrolyzes concomitantly the 17α-acyloxy group, when it is present in the compound (III), to the corresponding 17α-hydroxyl group in compound (IV).

The aforesaid 3,20 - bis-cycloethylenedioxy - 19 - lower alkyl-19-hydroxy-$\Delta^5$-10α-pregnene derivative (IV) is oxidized, preferably with chromium trioxide in pyridine, to produce the corresponding 3,20-bis-cycloethylenedioxy-19-lower alkyl-19-keto-$\Delta^5$-10α-pregnene derivative (V), the ketone group of which is eliminated under conventional Wolff-Kishner conditions, thus affording the corresponding 3,20-bis-cycloethylenedioxy - 19 - lower alkyl-$\Delta^5$-10α-pregnene derivative (VI). Treatment of the latter compound with an acid, such as hydrochloric acid, yields the corresponding 19-lower alkyl-$\Delta^4$-10α-pregnene-3,20-dione (VII).

The aforesaid 3,20 - bis-cycloethylenedioxy - 19 - lower alkyl-$\Delta^5$-10α-pregnene compound (VI) is treated with an organic peracid, such as monoperphthalic acid, in an inert solvent, preferably chloroform, to produce the corresponding 3,20-bis-cycloethylenedioxy-5α,6α - oxido - 19 - lower alkyl-10α-pregnane (VIII).

Upon reaction of the latter 3,20-bis-cycloethylenedioxy-5α,6α-oxido compound with methyl magnesium bromide in an inert solvent such as ether or tetrahydrofuran, followed by conventional working up and treatment of the residue with a mineral acid, such as 8% sulfuric acid, and thereafter with thionyl chloride in pyridine at about −10° C., for approximately 4 minutes, there is obtained the corresponding 19-lower alkyl-6β-methyl-$\Delta^4$-10α-pregnene-3,20-dione (IX: Z=β-methyl). The latter 6β-methyl derivative is treated with an alkali metal hydroxide, such as sodium hydroxide, in a suitable solvent, such as methanol, thus affording the corresponding 6α-methyl derivative (IX: Z=α-methyl).

When treating the 3,20 - bis-cycloethylenedioxy - 5α,6α-oxido compounds (VIII) with hydrogen chloride, in a suitable organic solvent, such as ethyl acetate, there are produced the corresponding 6α-chloro-19-lower alkyl-$\Delta^4$-pregnene-3,20-dione derivatives (IX: Z=α-chlorine).

Upon reaction of the 3,20-bis-cycloethylenedioxy-5α-6α-oxido compounds (VIII) with anhydrous hydrogen fluoride, preferably in the presence of boron trifluoride etherate, followed by treatment with hydrogen chloride, there are produced the corresponding 6α-fluoro-19-lower alkyl-$\Delta^4$-10α-pregnene - 3,20 - dione derivatives (IX: Z=α-fluorine).

The 19-lower alkyl-$\Delta^4$-10α-pregnene-3,20-dione derivatives (VII) are treated with ethyl orthoformate in the presence of p-toluenesulfonic acid in an inert solvent, thus affording the corresponding 19-lower alkyl-3-ethoxy-$\Delta^{3,5}$-10α-pregnadien-20-one derivatives which upon reaction with approximately 1 molar equivalent of N-chloro succinimide or another N-chloro amide or imide, in the presence of sodium acetate and acetic acid, yield the corresponding 6β-chloro-19-lower alkyl-$\Delta^4$-10α-pregnene-3,20-dione derivatives (IX: Z=β-chlorine).

The aforesaid 19-lower alkyl-3-ethoxy-$\Delta^{3,5}$-10α-pregnadien-20-one derivatives are treated with perchloryl fluoride in dimethylformamide, to produce the corresponding 6β-fluoro-19-lower alkyl-$\Delta^4$-10α-pregnene-3,20-dione derivatives (IX: Z=β-fluorine).

The 6α-halo compounds of the present invention (IX: Z=α-halogen) may also be obtained by treatment of the corresponding 6β-halo compounds (IX: Z=β-halogen) with hydrogen chloride in acetic acid.

The 19-lower alkyl-$\Delta^4$-10α-pregnene-3,20-dione derivatives (IX) are treated with 2,3-dichloro-5,6-dicyano-1,4-benzoquinone in an inert solvent, such as dioxane, preferably at reflux temperature for a period of time of approximately 10 hours to produce the corresponding 19-lower alkyl-$\Delta^{1,4}$-10α-pregnadiene-3,20-dione compounds (XI).

The 19-lower alkyl-$\Delta^4$-10α-pregnene-3,20-dione derivatives (IX) upon treatment with ethyl orthoformate in an inert solvent and in the presence of p-toluenesulfonic acid furnish the corresponding 19-lower alkyl - 3 - ethoxy-$\Delta^{3,5}$-10α-pregnadiene derivatives, which are treated with approximately 1 molar equivalent of 2,3-dichloro-5,6-dicyano-1,4-benzoquinone, in the presence of a catalytic amount of acid and in an inert solvent, to give the corresponding 19-lower alkyl-$\Delta^{4,6}$-10α-pregnadiene-3,20-dione derivatives (X).

The latter $\Delta^{4,6}$-compounds may be converted into the corresponding $\Delta^{1,4,6}$-derivatives (XII) by further treatment with 2,3-dichloro - 5,6 - dicyano - 1,4-benzoquinone under the conditions specified hereinbefore for the production of the $\Delta^{1,4}$-derivatives (XI).

The compounds of the present invention having a 16α, 17α-ketonide grouping, yield the corresponding 16α,17α, diols, by conventional treatment with a strong acid such as formic acid. The obtained diols, upon conventional esterification in pyridine with an acylating agent, as for example, acetic anhydride or caproic anhydride, afford the corresponding 16-acylates.

The latter 16α,17α-diols upon conventional condensation with a ketone or aldehyde, such as benzaldehyde, acetophenone, methyl ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a hydroxyl group at C–17α, may be acylated by conventional treatment with an acylating agent, such as an anhydride derived from a hydrocarbon carboxylic acid of the type described hereinbefore, in the presence of p-toluenesulfonic acid, to produce the corresponding 17α-esters.

The following examples serve to illustrate the present invention, but are not intended to limit the scope thereof:

*Example I*

A mixture of 5 g. of $\Delta^4$-10α-pregnen-19-ol-3,20-dione (Cpd. No. 1) (Cross, U.S. pat. appl. Ser. No. 231,831 filed Oct. 19, 1962) 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20 - bis - cycloethylenedioxy-$\Delta^5$-10α-pregnen-19-ol (Cpd. No. 8).

Following exactly the same procedure, the starting compounds listed hereinafter under A (obtained according to the aforesaid patent application) were converted, respectively into the corresponding compounds set forth under B.

Following exactly the same procedure, the compounds Nos. 9 to 14, inclusive, were respectively transformed into:

Cpd. No.:
16. 3,20-bis-cycloethylenedioxy-16α-methyl-$\Delta^5$-10α-pregnen-19-al.
17. 3,20-bis-cycloethylenedioxy-16β-methyl-$\Delta^5$-10α-pregnen-19-al.
18. 3,20-bis-cycloethylenedioxy-16α,17α-isopropylidenedioxy-$\Delta^5$-10α-pregnen-19-al.
19. 3,20-bis-cycloethylenedioxy-$\Delta^5$-10α-pregnen-17α-ol-19-al 17-acetate.
20. 3,20-bis-cycloethylenedioxy-16α-methyl-$\Delta^5$-10α-pregnen-17α-ol-19-al 17-acetate.
21. 3,20-bis-cycloethylenedioxy-16β-methyl-$\Delta^5$-10α-pregnen-17α-ol-19-al 17-acetate.

*Example IV*

A solution of 5 g. of 3,20-bis-cycloethylenedioxy-$\Delta^5$-10α-pregnen-19-al (Cpd. No. 15) in 250 cc. of thiophene free benzene was treated with 27.5 cc. of 4 N methyl magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3,20 - bis-cycloethylenedioxy-19-methyl-$\Delta^5$-10α-pregnen-19-ol (Cpd. No. 22).

Following the same procedure the compounds Nos. 16 to 21, inclusive, were converted respectively into:

Cpd. No.:
23. 3,20 - bis - cycloethylenedioxy-16α,19-dimethyl-$\Delta^5$-10α-pregnen-19-ol.

| Cpd. No. | A | Cpd. No. | B |
|---|---|---|---|
| 2 | 16α-methyl-$\Delta^4$-10α-pregnen-19-ol-3,20-dione. | 9 | 3,20-bis-cycloethylenedioxy-16α-methyl-$\Delta^5$-10α-pregnen-19-ol. |
| 3 | 16β-methyl-$\Delta^4$-10α-pregnen-19-ol-3,20-dione. | 10 | 3,20-bis-cycloethylenedioxy-16β-methyl-$\Delta^5$-10α-pregnen-19-ol. |
| 4 | 16α,17α-isopropylidenedioxy-$\Delta^4$-10α-pregnen-19-ol-3,20-dione. | 11 | 3,20-bis-cycloethylenedioxy-16α,17α-isopropylidenedioxy-$\Delta^5$-10α-pregnen-19-ol. |
| 5 | $\Delta^4$-10α-pregnene-17α-19-diol-3,20-dione. | 12 | 3,20-bis-cycloethylenedioxy-$\Delta^5$-10α-pregnene-17α,19-diol. |
| 6 | 16α-methyl-$\Delta^4$-10α-pregnene-17α,19-diol-3,20-dione. | 13 | 3,20-bis-cycloethylenedioxy-16α-methyl-$\Delta^5$-10α-pregnene-17α,19-diol. |

*Example II*

16β-methyl-$\Delta^4$-10α-pregnene - 17α,19 - diol - 3,20-dione (Cpd. No. 7), obtained in accordance with my copending U.S. pat. appl. Ser. No. 231,831, filed October 19, 1962, was treated following the above procedure, thus furnishing 3,20 - bis-cycloethylenedioxy - 16β - methyl-$\Delta^5$-10α-pregnene-17α,19-diol (Cpd. No. 14).

*Example III*

A solution of 6 g. of 3,20-bis-cycloethylenedioxy-$\Delta^5$-10α-pregnen-19-ol (Cpd. No. 8) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3,20-bis-cycloethylenedioxy-$\Delta^5$-10α-pregnen-19-al (Cpd. No. 15).

24. 3,20 - bis - cycloethylenedioxy-16β,19-dimethyl-$\Delta^5$-10α-pregnene-19-ol.
25. 3,20 - bis - cycloethylenedioxy-16α,17α-isopropylidenedioxy-19-methyl-$\Delta^5$-10α-pregene-19-ol.
26. 3,20 - bis - cycloethylenedioxy-19-methyl-$\Delta^5$-10α-pregnene-17α,19-diol.
27. 3,20 - bis - cycloethylenedioxy-16α,19-dimethyl-$\Delta^5$-10α-pregnene-17α,19-diol.
28. 3,20 - bis - cycloethylenedioxy-16β,19-dimethyl-$\Delta^5$-10α-pregnene-17α,19-diol.

*Example V*

3,20 - bis - cycloethylenedioxy-$\Delta^5$-10α-pregnen-19-ol (Cpd. No. 15) was treated in accordance with Example IV, except that methyl magnesium bromide was substituted by ethyl magnesium bromide, thus yielding 3,20-bis-cycloethylenedioxy-19-ethyl-$\Delta^5$-10α-pregnen-19-ol (Cpd. No. 29).

The compounds Nos. 16 to 21, inclusive, were treated by the same procedure, thus affording respectively:

Cpd. No.:
30. 3,20 - bis - cycloethylenedioxy-16α-methyl-19-ethyl-Δ$^5$-10α-pregnen-19-ol.
31. 3,20 - bis - cycloethylenedioxy-16β-methyl-19-ethyl-Δ$^5$-10α-pregnen-19-ol.
32. 3,20 - bis-cycloethylenedioxy-16α,17α-isopropylidenedioxy-19-ethyl-Δ$^5$-10α-pregnen-19-ol.
33. 3,20 - bis - cycloethylenedioxy-19-ethyl-Δ$^5$-10α-pregnene-17α,19-diol.
34. 3,20 - bis - cycloethylenedioxy-16α-methyl-19-ethyl-Δ$^5$-10α-pregnen-17α-19-diol.
35. 3,20 - bis - cycloethylenedioxy-16β-methyl-19-ethyl-Δ$^5$-10α-pregnene-17α,19-diol.

Example VI

A solution of 6 g. of 3,20-bis-cycloethylenedioxy-19-methyl-Δ$^5$-10α-pregnen-19-ol (Cpd. No. 22) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3,20 - bis-cycloethylenedioxy-19-methyl-Δ$^5$-10α-pregnene-19-one (Cpd. No. 36).

Following the same procedure the compounds Nos. 23 to 35, inclusive, were converted respectively into:

Cpd. No.:
37. 3,20-bis-cycloethylenedioxy-16α,19-dimethyl-Δ$^5$-10α-pregnen-19-one.
38. 3,20-bis-cycloethylenedioxy-16β,19-dimethyl-Δ$^5$-10α-pregnen-19-one.
39. 3,20-bis-cycloethylenedioxy-16α,17α-isopropylidene-dioxy-19-methyl-Δ$^5$-10α-pregnen-19-one.
40. 3,20-bis-cycloethylenedioxy-19-methyl-Δ$^5$-10α-pregnen-17α-ol-19-one.
41. 3,20-bis-cycloethylenedioxy-16α,19-dimethyl-Δ$^5$-10α-pregnen-17α-ol-19-one.
42. 3,20-bis-cycloethylenedioxy-16β,19-dimethyl-Δ$^5$-10α-pregnen-17α-ol-19-one.
43. 3,20-bis-cycloethylenedioxy-19-ethyl-Δ$^5$-10α-pregnen-19-one.
44. 3,20-bis-cycloethylenedioxy-16α-methyl-19-ethyl-Δ$^5$-10α-pregnen-19-one.
45. 3,20-bis-cycloethylenedioxy-16β-methyl-19-ethyl-Δ$^5$-10α-pregnen-19-one.
46. 3,20-bis-cycloethylenedioxy-16α,17α-isopropylidene-dioxy-19-ethyl-Δ$^5$-10α-pregnen-19-one.
47. 3,20-bis-cycloethylenedioxy-19-ethyl-Δ$^5$-10α-pregnen-17α-ol-19-one.
48. 3,20-bis-cycloethylenedioxy-16α-methyl-19-ethyl-Δ$^5$-10α-pregnen-17α-ol-19-one.
49. 3,20-bis-cycloethylenedioxy-16β-methyl-19-ethyl-Δ$^5$-10α-pregnen-17α-ol-19-one.

Example VII

A mixture of 1 g. of 3,20-biscycloethylenedioxy-19-methyl-Δ$^5$-10α-pregnen-19-one (Cpd. No. 36), 2 g. of hydrazine hydrate, 1.2 g. of potassium hydroxide, 1.2 cc. of water and 1.2 cc. of diethylene glycol was heated under reflux for 45 minutes. It was then heated in an open flask until the temperature of the reaction mixture reached 200° C., a reflux condenser was attached, and refluxing was continued for a further 2 hours. The solution was cooled, water added and the product isolated by extraction with ether. Recrystallization of the residue obtained after evaporation of the solvent from acetone-hexane afforded 3,20 - bis-cycloethylenedioxy-19-methyl-Δ$^5$-10α-pregnene (Cpd. No. 50).

The compounds Nos. 37 to 49, inclusive, were treated by the above procedure, thus furnishing respectively:

Cpd. No.:
51. 3,20-bis-cycloethylenedioxy-16α,19-dimethyl-Δ$^5$-10α-pregnene.
52. 3,20-bis-cycloethylenedioxy-16β,19-dimethyl-Δ$^5$-10α-pregnene.
53. 3,20-bis-cycloethylenedioxy-16α,17α-isopropylidene-dioxy-19-methyl-Δ$^5$-10α-pregnene.
54. 3,20-bis-cycloethylenedioxy-19-methyl-Δ$^5$-10α-pregnen-17α-ol.
55. 3,20-bis-cycloethylenedioxy-16α,19-dimethyl-Δ$^5$-10α-pregnen-17αol.
56. 3,20-bis-cycloethylenedioxy-16β,19-dimethyl-Δ$^5$-10α-pregnen-17α-ol.
57. 3,20-bis-cycloethylenedioxy-19-ethyl-Δ$^5$-10α-pregnene.
58. 3,20-bis-cycloethylenedioxy-16α-methyl-19-ethyl-Δ$^5$-10α-pregnene.
59. 3,20-bis-cycloethylenedioxy-16β-methyl-19-ethyl-Δ$^5$-10α-pregnene.
60. 3,20-bis-cycloethylenedioxy-16α,17α-isopropylidene-dioxy-19-ethyl-Δ$^5$-10α-pregnene.
61. 3,20-bis-cycloethylenedioxy-19-ethyl-Δ$^5$-10α-pregnen-17α-ol.
62. 3,20-bis-cycloethylenedioxy-16α-methyl-19-ethyl-Δ$^5$-10α-pregnen-17α-ol.
63. 3,20-bis-cycloethylenedioxy-16β-methyl-19-ethyl-Δ$^5$-10α-pregnen-17α-ol.

Example VIII

A solution of 500 mg. of 3,20-bis-cycloethylenedioxy-19-methyl-Δ$^5$-10α-pregnene (Cpd. No. 50) in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-methyl-Δ$^4$-10α-pregnene-3,20-dione (Cpd. No. 64).

Following the same procedure, the compounds Nos. 51 to 63, inclusive, were converted respectively into:

Cpd. No.:
65. 16α,19-dimethyl-Δ$^4$-10α-pregnene-3,20-dione.
66. 16β,19-dimethyl-Δ$^4$-10α-pregnene-3,20-dione.
67. 16α,17α-isopropylidenedioxy-19-methyl-Δ$^4$-10α-pregnene-3,20-dione.
68. 19-methyl-Δ$^4$-10α-pregnen-17α-ol-3,20-dione.
69. 16α,19-dimethyl-Δ$^4$-10α-pregnen-17α-ol-3,20-dione.
70. 16β,19-dimethyl-Δ$^4$-10α-pregnen-17α-ol-3,20-dione.
71. 19-ethyl-Δ$^4$-10α-pregnene-3,20-dione.
72. 16α-methyl-19-ethyl-Δ$^4$-10α-pregnene-3,20-dione.
73. 16β-methyl-19-ethyl-Δ$^4$-10α-pregnene-3,20-dione.
74. 16α,17α-isopropylidenedioxy-19-ethyl-Δ$^4$-10α-pregnene-3,20-dione.
75. 19-ethyl-Δ$^4$-10α-pregnen-17α-ol-3,20-dione.
76. 16α-methyl-19-ethyl-Δ$^4$-10α-pregnen-17α-ol-3,20-dione.
77. 16β-methyl-19-ethyl-Δ$^4$-10α-pregnen-17α-ol-3,20-dione.

Example IX

A solution of 2.5 g. of 3,20-bis-cycloethylenedioxy-19-methyl-Δ$^5$-10α-pregnene (Cpd. No. 50) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3,20- bis - cycloethylenedioxy - 19-methyl-5α,6α-oxido-10α-pregnane (Cpd. No. 78).

The compounds Nos. 51 to 63, inclusive, were treated by the above procedure, thus furnishing respectively Cpd. No.:
79. 3,20-bis-cycloethylenedioxy-16α,19-dimethyl-5α,6α-oxido-10α-pregnane.
80. 3,20-bis-cycloethylenedioxy-16β,19-dimethyl-5α,6α-oxido-10α-pregnane.
81. 3,20-bis-cycloethylenedioxy-16α,17α-isopropylidenedioxy-19-methyl-5α,6α-oxido-10α-pregnane.
82. 3,20-bis-cycloethylenedioxy-19-methyl-5α,6α-oxido-10a-pregnan-17α-ol.
83. 3,20-bis-cycloethylenedioxy-16α,19-dimethyl-5α,6α-oxido-10α-pregnan-17α-ol.
84. 3,20-bis-cycloethylenedioxy-16β,19-dimethyl-5α,6α-oxido-10α-pregnan-17α-ol.
85. 3,20-bis-cycloethylenedioxy-19-ethyl-5α,6α-oxido-10α-pregnane.
86. 3,20-bis-cycloethylenedioxy-16α-methyl-19-ethyl-5α,6α-oxido-10α-pregnane.
87. 3,20-bis-cycloethylenedioxy-16β-methyl-19-ethyl-5α,6α-oxido-10α-pregnane.
88. 3,20-bis-cycloethylenedioxy-16α,17α-isopropylidenedioxy-19-ethyl-5α,6α-oxido-10α-pregnane.
89. 3,20-bis-cycloethylenedioxy-19-ethyl-5α,6α-oxido-10α-pregnan-17α-ol.
90. 3,20-bis-cycloethylenedioxy-16α-methyl-19-ethyl-5α,6α-oxido-10α-pregnan-17α-ol.
91. 3,20-bis-cycloethylenedioxy-16β-methyl-19-ethyl-5α,6α-oxido-10α-pregnan-17α-ol.

*Example X*

To a solution of 40 cc. of 4 N methyl magnesium bromide in ether was added, with stirring, a solution of 2 g. of 3,20-bis-cycloethylenedioxy-19-methyl-5α,6α-oxido-10α-pregnane (Cpd. No. 78), in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was re-adapted and the mixture refluxed for an additional 4 hours. 400 cc. of a saturated solution of ammonium chloride was added slowly to the cooled mixture which was then stirred for 15 minutes before transfer to a separatory funnel. It was then diluted with ethyl acetate, the organic layer was separated, dried and evaporated to dryness, thus affording a solid residue.

A solution of this residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off, washed thoroughly with water and air dried.

A solution of the dry precipitate in 7 cc. of dry pyridine was cooled to −10° C., treated with 0.4 cc. of thionyl chloride and the mixture allowed to stand for 4 minutes at this temperature. Ice-water was added and the crystalline precipitate was filtered, washed and dried, yielding 6β,19 - dimethyl - Δ⁴ - 10α - pregnene - 3,20 - dione (Cpd. No. 92).

Following the same procedure, the compounds Nos. 79 to 91, inclusive, were converted respectively into:

Cpd. No.:
93. 6β,16α,19-trimethyl-Δ⁴-10α-pregnene-3,20-dione.
94. 6β,16β,19-trimethyl-Δ⁴-10α-pregnene-3,20-dione.
95. 16α,17α-isopropylidenedioxy-6β,19-dimethyl-Δ⁴-10α-pregnene-3,20-dione.
96. 6β,19-dimethyl-Δ⁴-10α-pregnen-17α-ol-3,20-dione.
97. 6β,16α,19-trimethyl-Δ⁴-10α-pregnen-17α-ol-3,20-dione.
98. 6β,16β,19-trimethyl-Δ⁴-10α-pregnen-17α-ol-3,20-dione.

Cpd. No.:
99. 6β-methyl-19-ethyl-Δ⁴-10α-pregnene-3,20-dione.
100. 6β,16α-dimethyl-19-ethyl-Δ⁴-10α-pregnene-3,20-dione.
101. 6β,16β-dimethyl-19-ethyl-Δ⁴-10α-pregnene-3,20-dione.
102. 16α,17α-isopropylidenedioxy-6β-methyl-19-ethyl-Δ⁴-10α-pregnene-3,20-dione.
103. 6β-methyl-19-ethyl-Δ⁴-10α-pregnen-17α-ol-3,20-dione.
104. 6β,16α-dimethyl-19-ethyl-Δ⁴-10α-pregnen-17α-ol-3,20-dione.
105. 6β,16β-dimethyl-19-ethyl-Δ⁴-10α-pregnen-17α-ol-3,20-dione.

*Example XI*

1 g. of 6β,19 - dimethyl-Δ⁴-10α - pregnene - 3,20 - dione (Cpd. No. 92) was dissolved in 20 cc. of methanol containing 0.2 g. of sodium hydroxide and the mixture was kept for one and a half hours at room temperature, then poured into water and extracted with methylene chloride. Evaporation of the methylene chloride solution and crystallization of the residue from acetone-hexane yielded 6α,19 - dimethyl-Δ⁴-10α-pregnene - 3,20 - dione (Cpd. No. 105).

Following the same procedure, the compounds Nos. 93 to 105, inclusive, were converted respectively into:

Cpd. No.:
107. 6α,16α,19-trimethyl-Δ⁴-10α-pregnene-3,20-dione.
108. 6α,16β,19-trimethyl-Δ⁴-10α-pregnene-3,20-dione.
109. 16α,17α-isopropylidenedioxy-6α,19-dimethyl-Δ⁴-10α-pregnene-3,20-dione.
110. 6α,19-dimethyl-Δ⁴-10α-pregnene-17α-ol-3,20-dione.
111. 6α,16α,19-trimethyl-Δ⁴-10α-pregnen-17α-ol-3,20-dione.
112. 6α,16β,19-trimethyl-Δ⁴-10α-pregnen-17α-ol-3,20-dione.
113. 6α-methyl-19-ethyl-Δ⁴-10α-pregnene-3,20-dione.
114. 6α,16α-dimethyl-19-ethyl-Δ⁴-10α-pregnene-3,20-dione.
115. 6α,16β-dimethyl-19-ethyl-Δ⁴-10α-pregnene-3,20-dione.
116. 16α,17α-Δ-isopropylidenedioxy-6α-methyl-19-ethyl-Δ⁴-10α-pregnene-3,20-dione.
117. 6α-methyl-19-ethyl-Δ⁴-10α-pregnene-17α-ol-3,20-dione.
118. 6α,16α-dimethyl-19-ethyl-Δ⁴-10α-pregnen-17α-ol-3,20-dione.
119. 6α,16β-dimethyl-19-ethyl-Δ⁴-10α-pregnen-17α-ol-3,20-dione.

*Example XII*

Into a suspension of 1 g. of 3,20-bis-cycloethylenedioxy-19-methyl-5α,6α-oxido-10α-pregnane (Cpd No. 78) in 35 cc. of glacial acetic acid, was passed a slow stream of dry hydrogen chloride, after 10 minutes all the solid material was dissolved. The gas was passed through the reaction mixture for a total of 5 hours. The solution was concentrated to about one-third its initial volume by distillation under reduced pressure at 35° C., then it was poured into ice-water. The precipitate formed was collected, washed with water to neutrality and dried. Recrystallization from methylene chloride afforded 6α-chloro-19-methyl-Δ⁴-10α-pregnene-3,20-dione (Cpd. No. 120).

Following the same procedure, the compounds Nos. 79 to 91, inclusive, were converted respectively into:

Cpd. No.:
121. 6α-chloro-16α,19-dimethyl-Δ⁴-10α-pregnene-3,20-dione.
122. 6α-chloro-16β,19-dimethyl-Δ⁴-10α-pregnene-3,20-dione.

Cpd. No.:
123. 6α-chloro-16α,17α-isopropylidenedioxy-19-methyl-Δ$^4$-10α-pregnene-3,20-dione.
124. 6α-chloro-19-methyl-Δ$^4$-10α-pregnen-17α-ol-3,20-dione.
125. 6α-chloro-16α,19-dimethyl-Δ$^4$-10α-pregnen-17α-ol-3,20-dione.
126. 6α-chloro-16β,19-dimethyl-Δ$^4$-10α-pregnene-17α-ol-3,20-dione.
127. 6α-chloro-19-Δ$^4$-10α-pregnene-3,20-dione.
128. 6α-chloro-16α-methyl-19-ethyl-Δ$^4$-10α-pregnene-3,20-dione.
129. 6α-chloro-16β-methyl-19-ethyl-Δ$^4$-10α-pregnene-3,20-dione.
130. 6α-chloro-16α,17α-isopropylidenedioxy-19-ethyl-Δ$^4$-10α-pregnene-3,20-dione.
131. 6α-chloro-19-ethyl-Δ$^4$-10α-pregnen-17α-ol-3,20-dione.
132. 6α-chloro-16α-methyl-19-ethyl-Δ$^4$-10α-pregnen-17α-ol-3,20-dione.
133. 6α-chloro-16β-methyl-19-ethyl-Δ$^4$-10α-pregnen-17α-ol-3,20-dione.

*Example XIII*

2.8 cc. of boron trifluoride etherate was slowly added with stirring to 220 mg. of anhydrous hydrogen fluoride cooled in an acetone-Dry Ice bath.

To a solution of 1 g. of compound No. 78 in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was suspended in 40 cc. of ethyl acetate and there was passed a slow stream of dry hydrochloric acid. The gas was passed through the reaction mixture for a total of 5 hours. The solution was then washed abundantly with water, dried and evaporated to dryness. The residue was washed with water to neutrality and dried. Recrystallization from methylene chloride-hexane afforded 6α - fluoro-19-methyl-Δ$^4$-10α-pregnene-3,20-dione (Cpd. No. 134).

Following the same procedure, the compounds Nos. 79 to 91, inclusive, were converted respectively into:

Cpd. No.:
135. 6α-fluoro-16α,19-dimethyl-Δ$^4$-10α-pregnene-3,20-dione.
136. 6α-fluoro-16β,19-dimethyl-Δ$^4$-10α-pregnene-3,20-dione.
137. 6α-fluoro-16α,17α-isopropylidenedioxy-19-methyl-Δ$^4$-10α-pregnene-3,20-dione.
138. 6α-fluoro-19-methyl-Δ$^4$-10α-pregnen-17α-ol-3,20-dione.
139. 6α-fluoro-16α,19-dimethyl-Δ$^4$-10α-pregnene-17α-ol-3,20-dione.
140. 6α-fluoro-16β,19-dimethyl-Δ$^4$-10α-pregnene17α-ol-3,20-dione.
141. 6α-fluoro-19-ethyl-Δ$^4$-10α-pregnene-3,20-dione.
142. 6α-fluoro-16α-methyl-19-ethyl-Δ$^4$-10α-pregnene-3,20-dione.
143. 6α-fluoro-16β-methyl-19-ethyl-Δ$^4$-10α-pregnene-3,20-dione.
144. 6α-fluoro-16α,17α-isopropylidenedioxy-19-ethyl-Δ$^4$-10α-pregnene-3,20-dione.
145. 6α-fluoro-19-ethyl-Δ$^4$-10α-pregnen-17α-ol-3,20-dione.
146. 6α-fluoro-16α-methyl-19-ethyl-Δ$^4$-10α-pregnen-17α-ol-3,20-dione.
147. 6α-fluoro-16β-methyl-19-ethyl-Δ$^4$-10α-pregnen-17α-ol-3,20-dione.

*Example XIV*

A suspension of 1 g. of 19-methyl-Δ$^4$-10α-pregnene-3,20-dione (Cpd. No. 64) in 7.5 cc. of anhydrous peroxide-free dioxane was treated with 1.2 cc. of freshly distilled ethyl orthoformate and 0.8 g. of p-toluene-sulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 3-ethoxy-19-methyl-Δ$^{3,5}$-10α-pregnadien-20-one (Cpd. No. 148).

The compounds Nos. 65 to 77, inclusive, were treated following the above procedure, thus producing respectively:

Cpd. No.:
149. 3-ethoxy-16α,19-dimethyl-Δ$^{3,5}$-10α-pregnadien-20-one.
150. 3-ethoxy-16β,19-dimethyl-Δ$^{3,5}$-10α-pregnadien-20-one.
151. 3-ethoxy-16α-17α-isopropylidenedioxy-19-methyl-Δ$^{3,5}$-10α-pregnadien-20-one.
152. 3-ethoxy-19-methyl-Δ$^{3,5}$-10α-pregnadien-17α-ol-20-one.
153. 3-ethoxy-16α,19-dimethyl-Δ$^{3,5}$-10α-pregnadien-17α-ol-20-one.
154. 3-ethoxy-16β,19-dimethyl-Δ$^{3,5}$-10α-pregnadien-17α-ol-20-one.
155. 3-ethoxy-19-ethyl-Δ$^{3,5}$-10α-pregnadien-20-one.
156. 3-ethoxy-16α-methyl-19-ethyl-Δ$^{3,5}$-10α-pregnadien-20-one.
157. 3-ethoxy-16β-methyl-19-ethyl-Δ$^{3,5}$-10α-pregnadien-20-one.
158. 3-ethoxy-16α,17α-isopropylidenedioxy-19-ethyl-Δ$^{3,5}$-10α-pregnadien-20-one.
159. 3-ethoxy-19-ethyl-Δ$^{3,5}$-10α-pregnadien-17α-ol-20-one.
160. 3-ethoxy-16α-methyl-19-ethyl-Δ$^{3,5}$-10α-pregnadien-17α-ol-20-one.
161. 3-ethoxy-16β-methyl-19-ethyl-Δ$^{3,5}$-10α-pregnadien-17α-ol-20-one.

*Example XV*

A mixture of 5 g. of 3-ethoxy-19-methyl-Δ$^{3,5}$-10α-pregnadien-20-one (Cpd. No. 148), 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-19-methyl-Δ$^4$-10α-pregnene-3,20-dione (Cpd. No. 162).

Following the same procedure, the compounds Nos. 149 to 161, inclusive, were converted respectively into:

Cpd. No.:
163. 6β-chloro-16α,19-dimethyl-Δ$^4$-10α-pregnene-3,20-dione.
164. 6β-chloro-16β,19-dimethyl-Δ$^4$-10α-pregnene-3,20-dione.
165. 6β-chloro-16α,17α-isopropylidenedioxy-19-methyl-Δ$^4$-10α-pregnene-3,20-dione.
166. 6β-chloro-19-methyl-Δ$^4$-10α-pregnen-17α-ol-3,20-dione.
167. 6β-chloro-16α,19-dimethyl-Δ$^4$-10α-pregnen-17α-ol-3,20-dione.
168. 6β-chloro-16β,19-dimethyl-Δ$^4$-10α-pregnen-17α-ol-3,20-dione.
169. 6β-chloro-19-ethyl-Δ$^4$-10α-pregnene-3,20-dione.
170. 6β-chloro-16α-methyl-19-ethyl-Δ$^4$-10α-pregnene-3,20-dione.

Cpd. No.:
171. 6β-chloro-16β-methyl-19-ethyl-Δ⁴-10α-pregnene-3,20-dione.
172. 6β-chloro-16α,17α-isopropylidenedioxy-19-ethyl-Δ⁴-10α-pregnene-3,20-dione.
173. 6β-chloro-19-ethyl-Δ⁴-10α-pregnen-17α-ol-3,20-dione.
174. 6β-chloro-16α-methyl-19-ethyl-Δ⁴-10α-pregnene-17α-ol-3,20-dione.
175. 6β-chloro-16β-methyl-19-ethyl-Δ⁴-10α-pregnene-17α-ol-3,20-dione.

*Example XVI*

1 g. of 3-ethoxy-19-methyl-Δ³,⁵-10α-pregnadien-20-one (Cpd. No. 148) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6β-fluoro-19-methyl-Δ⁴-10α-pregnene-3,20-dione (Cpd. No. 176).

Following the same procedure, the compounds Nos. 149 to 161, inclusive, were converted respectively into:

Cpd. No.:
177. 6β-fluoro-16α,19-dimethyl-Δ⁴-10α-pregnene-3,20-dione.
178. 6β-fluoro-16β,19-dimethyl-Δ⁴-10α-pregnene-3,20-dione.
179. 6β-fluoro-16α,17α-isopropylidenedioxy-19-methyl-Δ⁴-10α-pregnene-3,20-dione.
180. 6β-fluoro-19-methyl-Δ⁴-10α-pregnen-17α-ol-3,20-dione.
181. 6β-fluoro-16α,19-dimethyl-Δ⁴-10α-pregnen-17α-ol-3,20-dione.
182. 6β-fluoro-16β,19-dimethyl-Δ⁴-10α-pregnen-17α-ol-3,20-dione.
183. 6β-fluoro-19-ethyl-Δ⁴-10α-pregnene-3,20-dione
184. 6β-fluoro-16α-methyl-19-ethyl-Δ⁴-10α-pregnene-3,20-dione
185. 6β-fluoro-16β-methyl-19-ethyl-Δ⁴-10α-pregnene-3,20-dione
186. 6β-fluoro-16α,17α-isopropylidenedioxy-19-ethyl-Δ⁴-10α-pregnene-3,20-dione
187. 6β-fluoro-19-ethyl-Δ⁴-10α-pregnen-17α-ol-3,20-dione
188. 6β-fluoro-16α-methyl-19-ethyl-Δ⁴-10α-pregnen-17α-ol-3,20-dione
189. 6β-fluoro-16β-methyl-19-ethyl-Δ⁴-10α-pregnen-17α-ol-3,20-dione

*Example XVII*

A solution of 1 g. of 3-ethoxy-19-methyl-Δ³,⁵-10α-pregnadien-20-one (Cpd. No. 148) in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated hydroquinone was filtered off and 100 cc. of methylene chloride were added to the filtrate. The organic solution was washed with 5% aqueous sodium hydroxide solution until the washings were colorless, then with water to neutrality, dried over anhydrous sodium sulfate and evaporated to dryness. Crystallization from acetone-hexane gave 19-methyl-Δ⁴,⁶-10α-pregnadiene-3,20-dione (Cpd. No. 190).

Following the same procedure, the compounds Nos. 149 to 161, inclusive, were converted respectively into:

Cpd. No.:
191. 16α,19-dimethyl-Δ⁴,⁶-10α-pregnadiene-3,20-dione
192. 16β,19-dimethyl-Δ⁴,⁶-10α-pregnadiene-3,20-dione
193. 16α,17α-isopropylidenedioxy-19-methyl-Δ⁴,⁶-10α-pregnadiene-3,20-dione
194. 19-methyl-Δ⁴,⁶-10α-pregnadien-17α-ol-3,20-dione
195. 16α,19-dimethyl-Δ⁴,⁶-10α-pregnadien-17α-ol-3,20-dione
196. 16β,19-dimethyl-Δ⁴,⁶-10α-pregnadien-17α-ol-3,20-dione
197. 19-ethyl-Δ⁴,⁶-10α-pregnadiene-3,20-dione
198. 16α-methyl-9-ethyl-Δ⁴,⁶-10α-pregnadiene-3,20-dione
199. 16β-methyl-19-ethyl-Δ⁴,⁶-10α-pregnadiene-3,20-dione
200. 16α,17α-isopropylidenedioxy-19-ethyl-Δ⁴,⁶-10α-pregnadiene-3,20-dione
201. 19-ethyl-Δ⁴,⁶-10α-pregnadien-17α-ol-3,20-dione
202. 16α-methyl-19-ethyl-Δ⁴,⁶-10α-pregnadien-17α-ol-3,20-dione
203. 16β-methyl-19-ethyl-Δ⁴,⁶-10α-pregnadien-17α-ol-3,20-dione

*Example XVIII*

6α-chloro-19-methyl-Δ⁴-10α-pregnene-3,20-dione (Cpd. No. 120) was successively treated in accordance with Examples XIV and XVII, thus yielding as final product 6-chloro-19-methyl-Δ⁴,⁶-10α-pregnadiene-3,20-dione (Cpd. No. 204).

Following the same procedure, the compounds Nos. 121 to 133, inclusive, were converted respectively into:

Cpd. No.:
205. 6-chloro-16α,19-dimethyl-Δ⁴,⁶-10α-pregnadiene-3,20-dione
206. 6-chloro-16β,19-dimethyl-Δ⁴,⁶-10α-pregnadiene-3,20-dione
207. 6-chloro-16α,17α-isopropylidenedioxy-19-methyl-Δ⁴,⁶-10α-pregnadiene-3,20-dione
208. 6-chloro-19-methyl-Δ⁴,⁶-10α-pregnadien-17α-ol-3,20-dione
209. 6-chloro-16α,19-dimethyl-Δ⁴,⁶-10α-pregnadien-17α-ol-3,20-dione
210. 6-chloro-16β,19-dimethyl-Δ⁴,⁶-10α-pregnadien-17α-ol-3,20-dione
211. 6-chloro-19-ethyl-Δ⁴,⁶-10α-pregnadiene-3,20-dione
212. 6-chloro-16α-methyl-19-ethyl-Δ⁴,⁶-10α-pregnadiene-3,20-dione
213. 6-chloro-16β-methyl-19-ethyl-Δ⁴,⁶-10α-pregnadiene-3,20-dione
214. 6-chloro-16α,17α-isopropylidenedioxy-19-ethyl-Δ⁴,⁶-10α-pregnadiene-3,20-dione
215. 6-chloro-19-ethyl-Δ⁴,⁶-10α-pregnadien-17α-ol-3,20-dione
216. 6-chloro-16α-methyl-19-ethyl-Δ⁴,⁶-10α-pregnadien-17α-ol-3,20-dione
217. 6-chloro-16β-methyl-19-ethyl-Δ⁴,⁶-10α-pregnadien-17α-ol-3,20-dione

*Example XIX*

The final compounds of Examples XI and XIII were treated successively in accordance with Examples XIV and XVII, thus affording as final products the corresponding Δ⁴,⁶-10α-pregnadiene-derivatives.

*Example XX*

A mixture of 500 mg. of 19-methyl-Δ⁴-10α-pregnene-3,20-dione (Cpd. No. 64), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19-methyl-$\Delta^{1,4}$-10α-pregnadiene-3,20-dione (Cpd. No. 218).

Following the same procedures, the compounds Nos. 65 to 77, inclusive, were converted respectively into:

Cpd. No.:
- 219. 16α,19-dimethyl-$\Delta^{1,4}$-10α-pregnadiene-3,20-dione
- 220. 16β,19-dimethyl-$\Delta^{1,4}$-10α-pregnadiene-3,20-dione
- 221. 16α,17α-isopropylidenedioxy-19-methyl-$\Delta^{1,4}$-10α-pregnadiene-3,20-dione
- 222. 19-methyl-$\Delta^{1,4}$-10α-pregnadien-17α-ol-3,20-dione
- 223. 16α,19 - dimethyl - $\Delta^{1,4}$-10α-pregnadien-17α-ol-3,20-dione
- 224. 16β,19 - dimethyl - $\Delta^{1,4}$-10α-pregnadien-17α-ol-3,20-dione
- 225. 19-ethyl-$\Delta^{1,4}$-10α-pregnadien-3,20-dione
- 226. 16α-methyl-19-ethyl-$\Delta^{1,4}$-10α-pregnadiene-3,20-dione
- 227. 16β-methyl-19-ethyl-$\Delta^{1,4}$-10α-pregnadiene-3,20-dione
- 228. 16α,17α - isopropylidenedioxy-19-ethyl-$\Delta^{1,4}$-10α-pregnadiene-3,20-dione
- 229. 19-ethyl-$\Delta^{1,4}$-10α-pregnadien-17α-ol-3,20-dione
- 230. 16α-methyl-19-ethyl-$\Delta^{1,4}$-10α-pregnadien-17α-ol-3,20-dione
- 231. 16β-methyl-19-ethyl-$\Delta^{1,4}$-10α-pregnadien-17α-ol-3,20-dione

*Example XXI*

The compounds Nos. 92 to 105, inclusive, were treated in accordance with Example XX, thus producing respectively:

Cpd. No.:
- 232. 6β,19-dimethyl-$\Delta^{1,4}$-10α-pregnadiene-3,20-dione
- 233. 6β,16α,19-trimethyl-$\Delta^{1,4}$-10α-pregnadiene-3,20-dione
- 234. 6β,16β,19-trimethyl-$\Delta^{1,4}$-10α-pregnadiene-3,20-dione
- 235. 16α,17α-isopropylidenedioxy-6β,19-dimethyl-$\Delta^{1,4}$-10α-pregnadiene-3,20-dione
- 236. 6β,19-dimethyl-$\Delta^{1,4}$-10α-pregnadien-17α-ol-3,20-dione
- 237. 6β,16α,19-trimethyl-$\Delta^{1,4}$-10α-pregnadien-17α-ol-3,20-dione
- 238. 6β,16β,19-trimethyl-$\Delta^{1,4}$-10α-pregnadien-17α-ol-3,20-dione
- 239. 6β-methyl-19-ethyl-$\Delta^{1,4}$-10α-pregnadiene-3,20-dione
- 240. 6β,16α-dimethyl-19-ethyl-$\Delta^{1,4}$-10α-pregnadiene-3,20-dione
- 241. 6β,16β-dimethyl-19-ethyl-$\Delta^{1,4}$-10α-pregnadiene-3,20-dione
- 242. 16α,17α-isopropylidenedioxy-6β-methyl-19-ethyl-$\Delta^{1,4}$-10α-pregnadiene-3,20-dione
- 243. 6β-methyl-19-ethyl-$\Delta^{1,4}$-10α-pregnadien-17α-ol-3,20-dione
- 244. 6β,16α-dimethyl-19-ethyl-$\Delta^{1,4}$-10α-pregnadien-17α-ol-3,20-dione
- 245. 6β,16β-dimethyl-19-ethyl-$\Delta^{1,4}$-10α-pregnadien-17α-ol-3,20-dione

*Example XXII*

The compounds Nos. 190 to 203, inclusive, were treated in accordance with Example XX, thus affording respectively:

Cpd. No.:
- 246. 19-methyl-$\Delta^{1,4,6}$-10α-pregnatriene-3,20-dione
- 247. 16α,19-dimethyl-$\Delta^{1,4,6}$-10α-pregnatriene-3,20-dione
- 248. 16β,19-dimethyl-$\Delta^{1,4,6}$-10α-pregnatriene-3,20-dione
- 249. 16α,17α-isopropylidenedioxy-19-methyl-$\Delta^{1,4,6}$-10α-pregnatriene-3,20-dione Cpd. No.:
- 250. 19-methyl-$\Delta^{1,4,6}$-10α-pregnatrien-17α-ol-3,20-dione
- 251. 16α,19-dimethyl-$\Delta^{1,4,6}$-10α-pregnatrien-17α-ol-3,20-dione
- 252. 16β,19-dimethyl-$\Delta^{1,4,6}$-10α-pregnatrien-17α-ol-3,20-dione
- 253. 19-ethyl-$\Delta^{1,4,6}$-10α-pregnatriene-3,20-dione
- 254. 16α-methyl-19-ethyl-$\Delta^{1,4,6}$-10α-pregnatriene-3,20-dione
- 255. 16β-methyl-19-ethyl-$\Delta^{1,4,6}$-10α-pregnatriene-3,20-dione
- 256. 16α,17α-isopropylidenedioxy-19-ethyl-$\Delta^{1,4,6}$-10α-pregnatriene-3,20-dione
- 257. 19-ethyl-$\Delta^{1,4,6}$-10α-pregnatrien-17α-ol-3,20-dione
- 258. 16α-methyl-19-ethyl-$\Delta^{1,4,6}$-10α-pregnatrien-17α-ol-3,20-dione
- 259. 16β-methyl-19-ethyl-$\Delta^{1,4,6}$-10α-pregnatrien-17α-ol-3,20-dione

*Example XXIII*

The compounds Nos. 106 to 147, inclusive, and Nos. 162 to 189, inclusive, were treated in accordance with Example XX, to produce the corresponding $\Delta^{1,4}$-pregnadiene derivatives.

*Example XXIV*

1 g. of 16α,17α-isopropylidenedioxy-19-methyl-$\Delta^{4}$-10α-pregnene-3,20-dione (Cpd. No. 67) was heated on the steam bath with 20 cc. of 60% formic acid for 1 hour, cooled, diluted with water and the precipitate was collected, washed with water, dried, and recrystallized from acetone-hexane, thus affording 19-methyl-$\Delta^{4}$-10α-pregnene-16α,17α-diol-3,20-dione (Cpd. No. 260).

The compounds Nos. 74, 109, 116, 123, 130, 137, 144, 193, 200, 207, 214, 221, 228, 249 and 256 were treated following exactly the same procedure, thus yielding respectively:

Cpd. No.:
- 261. 19-ethyl-$\Delta^{4}$-10α-pregnene-16α,17α-diol-3,20-dione
- 262. 6α,19-dimethyl-$\Delta^{4}$-10α-pregnene-16α,17α-diol-3,20-dione
- 263. 6α-methyl-19-ethyl-$\Delta^{4}$-10α-pregnene-16α,17α-diol-3,20-dione
- 264. 6α-chloro-19-methyl-$\Delta^{4}$-10α-pregnene-16α,17α-diol-3,20-dione
- 265. 6α-chloro-19-ethyl-$\Delta^{4}$-10α-pregnene-16α,17α-diol-3,20-dione
- 266. 6α-fluoro-19-methyl-$\Delta^{4}$-10α-pregnene-16α,17α-diol-3,20-dione
- 267. 6α-fluoro-19-ethyl-$\Delta^{4}$-10α-pregnene-16α,17α-diol-3,20-dione
- 268. 19-methyl-$\Delta^{4,6}$-10α-pregnadiene-16α,17α-diol-3,20-dione
- 269. 19-ethyl-$\Delta^{4,6}$-10α-pregnadiene-16α,17α-diol-3,20-dione
- 270. 6-chloro-19-methyl-$\Delta^{4,6}$-10α-pregnadiene-16α,17α-diol-3,20-dione
- 271. 6-chloro-19-ethyl-$\Delta^{4,6}$-10α-pregnadiene-16α,17α-diol-3,20-dione
- 272. 19-methyl-$\Delta^{1,4}$-10α-pregnadiene-16α,17α-diol-3,20-dione
- 273. 19-ethyl-$\Delta^{1,4}$-10α-pregnadiene-16α,17α-diol-3,20-dione
- 274. 19-methyl-$\Delta^{1,4,6}$-10α-pregnatriene-16α,17α-diol-3,20-dione
- 275. 19-ethyl-$\Delta^{1,4,6}$-10α-pregnatriene-16α,17α-diol-3,20-dione

*Example XXV*

A mixture of 1 g. of 19-methyl-$\Delta^{4}$-10α-pregnene-16α,17α-diol-3,20-dione (Cpd. No. 260), 4 cc. of pyridine and 2 cc. of acetic anhydride was kept at room temperature overnight, poured into ice water, the formed precipitate was filtered, washed with water and dried. Crystallization from acetone-hexane gave 19-methyl-Δ⁴-pregnene-16α,17α-diol-3,20-dione 16-acetate (Cpd. No. 276).

By the same method, the compounds Nos. 261 to 275, inclusive, were respectively converted into:

Cpd. No.:
- 277. 19-ethyl-Δ⁴-10α-pregnene-16α,17α-diol-3,20-dione 16-acetate
- 278. 6α,19-dimethyl-Δ⁴-10α-pregnene-16α,17α-diol-3,20-dione 16-acetate
- 279. 6α-methyl-19-ethyl-Δ⁴-10α-pregnene-16α,17α-diol-3,20-dione 16-acetate
- 280. 6α-chloro-19-methyl-Δ⁴-10α-pregnene-16α,17α-diol-3,20-dione 16-acetate
- 281. 6α-chloro-19-ethyl-Δ⁴-10α-pregnene-16α,17α-diol-3,20-dione 16-acetate
- 282. 6α-fluoro-19-methyl-Δ⁴-10α-pregnene-16α,17α-diol-3,20-dione 16-acetate
- 283. 6α-fluoro-19-ethyl-Δ⁴-10α-pregnene-16α,17α-diol-3,20-dione 16-acetate
- 284. 19-methyl-Δ⁴,⁶-10α-pregnadiene-16α,17α-diol-3,20-dione 16-acetate
- 285. 19-ethyl-Δ⁴,⁶-10α-pregnadiene-16α,17α-diol-3,20-dione 16-acetate
- 286. 6-chloro-19-methyl-Δ⁴,⁶-10α-pregnadiene-16α,17α-diol-3,20-dione 16-acetate
- 287. 6-chloro-19-ethyl-Δ⁴,⁶-10α-pregnadiene-16α,17α-diol-3,20-dione 16-acetate
- 288. 19-methyl-Δ¹,⁴-10α-pregnadiene-16α,17α-diol-3,20-dione 16-acetate
- 289. 19-ethyl-Δ¹,⁴-10α-pregnadiene-16α,17α-diol-3,20-dione 16-acetate
- 290. 19-methyl-Δ¹,⁴,⁶-10α-pregnatriene-16α,17α-diol-3,20-dione 16-acetate
- 291. 19-ethyl-Δ¹,⁴,⁶-10α-pregnatriene-16α,17α-diol-3,20-dione 16-acetate

*Example XXVI*

To a solution of 5 g. of 19-methyl-Δ⁴-10α-pregnen-17α-ol-3,20-dione (Cpd. No. 68) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-methyl-Δ⁴-10α-pregnen-17α-ol-3,20-dione caproate (Cpd. No. 292).

The compounds Nos. 69, 70, 75, 76, and 77 were treated according to the above method, thus giving respectively:

Cpd. No.:
- 293. 16α,19-dimethyl-Δ⁴-10α-pregnen-17α-ol-3,20-dione caproate
- 294. 16β,19-dimethyl-Δ⁴-10α-pregnen-17α-ol-3,20-dione caproate
- 295. 19-ethyl-Δ⁴-10α-pregnen-17α-ol-3,20-dione caproate
- 296. 16α-methyl-19α-ethyl-Δ⁴-10α-pregnen-17α-ol-3,20-dione caproate
- 297. 16β-methyl-19-ethyl-Δ⁴-10α-pregnen-17α-ol-3,20-dione caproate

*Example XXVII*

The compounds Nos. 110, 111, 112, 117, 118 and 119 were treated in accordance with the procedure described in Example XXVI, thus furnishing respectively:

Cpd. No.:
- 298. 6α,19-dimethyl-Δ⁴-10α-pregnen-17α-ol-3,20-dione caproate
- 299. 6α,16α,19-trimethyl-Δ⁴-10α-pregnen-17α-ol-3,20-dione caproate
- 300. 6α,16β,19-trimethyl-Δ⁴-10α-pregnen-17α-ol-3,20-dione caproate
- 301. 6α-methyl-19-ethyl-Δ⁴-10α-pregnen-17α-ol-3,20-dione caproate
- 302. 6α,16α-dimethyl-19-ethyl-Δ⁴-10α-pregnen-17α-ol-3,20-dione caproate
- 303. 6α,16β-dimethyl-19-ethyl-Δ⁴-10α-pregnen-17α-ol-3,20-dione caproate

*Example XXVIII*

The compounds Nos. 124, 125, 126, 131, 132 and 133 were treated according to Example XXVI, thus affording respectively:

Cpd. No.:
- 304. 6α-chloro-19-methyl-Δ⁴-10α-pregnen-17α-ol-3,20-dione caproate
- 305. 6α-chloro-16α,19-dimethyl-Δ⁴-10α-pregnen-17α-ol-3,20-dione caproate
- 306. 6α-chloro-16β,19-dimethyl-Δ⁴-10α-pregnen-17α-ol-3,20-dione caproate
- 307. 6α-chloro-19-ethyl-Δ⁴-10α-pregnen-17α-ol-3,20-dione caproate
- 308. 6α-chloro-16α-methyl-19-ethyl-Δ⁴-10-pregnen-17α-ol-3,20-dione caproate
- 309. 6α-chloro-16β-methyl-19-ethyl-Δ⁴-10α-pregnen-17α-ol-3,20-dione caproate

*Example XXIX*

The compounds Nos. 138, 139, 140, 145, 146 and 147 were treated according to Example XXVI, thus affording respectively:

Cpd. No.:
- 310. 6α-fluoro-19-methyl-Δ⁴-10α-pregnen-17α-ol-3,20-dione caproate
- 311. 6α-fluoro-16α,19-dimethyl-Δ⁴-10α-pregnen-17α-ol-3,20-dione caproate
- 312. 6α-fluoro-16β,19-dimethyl-Δ⁴-10α-pregnen-17α-ol-3,20-dione caproate
- 313. 6α-fluoro-19-ethyl-Δ⁴-10α-pregnen-17α-ol-3,20-dione caproate
- 314. 6α-fluoro-16α-methyl-19-ethyl-Δ⁴-10α-pregnen-17α-ol-3,20-dione caproate
- 315. 6α-fluoro-16β-methyl-19-ethyl-Δ⁴-10α-pregnen-17α-ol-3,20-dione caproate

*Example XXX*

The compounds Nos. 194, 195, 196, 201, 202 and 203 were treated following the procedure of Example XXVI, thus affording respectively:

Cpd. No.:
- 316. 19-methyl-Δ⁴,⁶-10α-pregnadien-17α-ol-3,20-dione caproate
- 317. 16α,19-dimethyl-Δ⁴,⁶-10α-pregnadien-17α-ol-3,20-dione caproate
- 318. 16β,19-dimethyl-Δ⁴,⁶-10α-pregnadien-17α-ol-3,20-dione caproate
- 319. 19-ethyl-Δ⁴,⁶-10α-pregnadien-17α-ol-3,20-dione caproate
- 320. 16α-methyl-19-ethyl-Δ⁴,⁶-10α-pregnadien-17α-ol-3,20-dione caproate
- 321. 16β-methyl-19-ethyl-Δ⁴,⁶-10α-pregnadien-17α-ol-3,20-dione caproate

Example XXXI

The compounds Nos. 222, 223, 224, 229, 230 and 231 were treated following the procedure of Example XXVI, thus affording respectively:

Cpd. No.:
322. 19-methyl-Δ$^{1,4}$-10α-pregnadien-17α-ol-3,20-dione caproate
323. 16α,19-dimethyl-Δ$^{1,4}$-10α-pregnadien-17α-ol-3,20-dione caproate
324. 16β,19-dimethyl-Δ$^{1,4}$-10α-pregnadien-17α-ol-3,20-dione caproate
325. 19-ethyl-Δ$^{1,4}$-10α-pregnadien-17α-ol-3,20-dione caproate
326. 16α-methyl-19-ethyl-Δ$^{1,4}$-10α-pregnadien-17α-ol-3,20-dione caproate
327. 16β-methyl-19-ethyl-Δ$^{1,4}$-10α-pregnadien-17α-ol-3,20-dione caproate

Example XXXII

Following the procedure described in Example XXVI, the compounds Nos. 250, 251, 252, 257, 258 and 259 were respectively converted into:

Cpd. No.:
328. 19-methyl-Δ$^{1,4,6}$-10α-pregnatrien-17α-ol-3,20-dione caproate
329. 16α,19-dimethyl-Δ$^{1,4,6}$-10α-pregnatrien-17α-ol-3,20-dione caproate
330. 16β,19-dimethyl-Δ$^{1,4,6}$-10α-pregnatrien-17α-ol-3,20-dione caproate
331. 19-ethyl-Δ$^{1,4,6}$-10α-pregnatrien-17-ol-3,20-dione caproate
332. 16α-methyl-19-ethyl-Δ$^{1,4,6}$-10α-pregnatrien-17α-ol-3,20-dione caproate
333. 16β-methyl-19-ethyl-Δ$^{1,4,6}$-10α-pregnatrien-17α-ol-3,20-dione caproate

Example XXXIII

The starting compounds of Example XXV were treated following the procedure described in that example except that acetic anhydride was substituted by caproic anhydride, enanthic anhydride and undecenoic anhydride thus affording the corresponding 16-caproates, 16-enanthates and 16-undecenoates of said starting compounds.

Example XXXIV

The compounds Nos. 276 to 291, inclusive, were treated in accordance with Example XXVI, thus yielding the corresponding 16-acetate-17-caproates.

Example XXXV

The starting compounds of Examples XXVI, XXVII, XXVIII, XXIX, XXX, XXXI and XXXII were treated in accordance with Example XXVI, but using acetic anhydride and enanthic anhydride instead of caproic anhydride thus affording the corresponding acetates and enanthates.

Example XXXVI

A solution of 500 mg. of 19-methyl-Δ$^4$-10α-pregnene-16α,17α-diol-3,20-dione (Cpd. No. 260), in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α-ethylidenedioxy-19-methyl-Δ$^4$-10α-pregnene-3,20-dione (Cpd. No. 334).

The compounds Nos. 261 to 275, inclusive, were treated according to the above procedure, thus giving the corresponding 16α,17α-ethylidenedioxy compounds.

Example XXXVII

A mixture of 1 g. of compound No. 260, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-methyl-Δ$^4$-10α-pregnene-16α,17α-diol-3,20-dione 16,17-acetophenonide (Cpd. No. 335).

The compounds Nos. 261 to 275, inclusive, were treated according to the above procedure, thus yielding the corresponding 16,17-acetophenonides.

Example XXXVIII

Into a solution of 3 g. of compound No. 176 in 150 cc. of glacial acetic acid was passed a slow stream of dry hydrochloric acid for 4 hours, while maintaining the temperature around 15° C. The mixture was then poured into ice-water, the precipitate collected, washed with water, dried and recrystallized from acetone-hexane to give a compound identical with compound No. 134.

I claim:
1. A compound of the following formula:

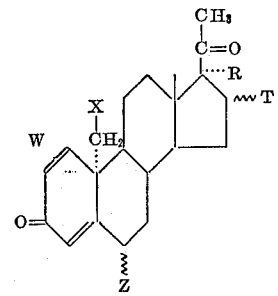

wherein R is selected from the group consisting of hydrogen, hydroxyl and a hydrocarbon carboxylic acyloxy group of less than 12 carbon atoms, T is a member of the group consisting of hydrogen, α-hydroxyl, α-hydrocarbon carboxylic acyloxy of less than 12 carbon atoms, α-methyl and β-methyl; T and R together represent the group

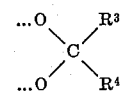

wherein R$^3$ and R$^4$ are selected from the group consisting of hydrogen and a lower hydrocarbon residue of up to 8 carbon atoms; X is lower alkyl; Z is a member of the group consisting of hydrogen, α-methyl, β-methyl, α-fluorine, β-fluorine, α-chlorine and β-chlorine; and W is selected from the group consisting of a saturated linkage and a double bond between C–1 and C–2.

2. A compound of the following formula:

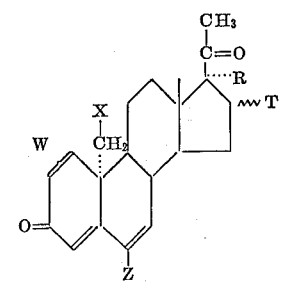

wherein R is selected from the group consisting of hydrogen, hydroxyl and a hydrocarbon carboxylic acyloxy group of less than 12 carbon atoms, T is a member of the group consisting of hydrogen, α-hydroxyl, α-hydrocarbon carboxylic acyloxy of less than 12 carbon atoms, α-methyl and β-methyl; T and R together represent the group

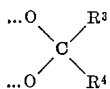

wherein $R^3$ and $R^4$ are selected from the group consisting of hydrogen and a lower hydrocarbon residue of up to 8 carbon atoms; X is lower alkyl; Z is a member of the group consisting of hydrogen, methyl, fluorine and chlorine; and W is selected from the group consisting of a saturated linkage and a double bond, between C–1 and C–2.

3. 19-methyl-$\Delta^4$-10α-pregnene-3,20-dione.
4. 16α,19-dimethyl-$\Delta^4$-10α-pregnene-3,20-dione
5. 16β,19-dimethyl-$\Delta^4$-10α-pregnene-3,20-dione.
6. 16α,17α - isopropylidenedioxy - 19 - methyl - $\Delta^4$-10α-pregnene-3,20-dione.
7. 19-methyl-$\Delta^4$-10α-pregnen-17α-ol-3,20-dione.
8. 16α,19-dimethyl-$\Delta^4$-10α-pregnen-17α-ol-3,20-dione.
9. 16β,19-dimethyl-$\Delta^4$-10α-pregnen-17α-ol-3,20-dione.
10. 19-ethyl-$\Delta^4$-10α-pregnene-3,20-dione.
11. 16α-methyl-19-ethyl-$\Delta^4$-10α-pregnene-3,20-dione.
12. 16β-methyl-19-ethyl-$\Delta^4$-10α-pregnene-3,20-dione.
13. 16α,17α - isopropylidenedioxy - 19 - ethyl-$\Delta^4$-10α-pregnene-3,20-dione.
14. 19-ethyl-$\Delta^4$-10α-pregnen-17α-ol-3,20-dione.
15. 16α - methyl - 19 - ethyl-$\Delta^4$-10α-pregnen-17α-ol-3,20-dione.
16. 16β - methyl - 19 - ethyl-$\Delta^4$-10α-pregnen-17α-ol-3,20,dione.
17. 6β,19-dimethyl-$\Delta^4$-10α-pregnene-3,20-dione.
18. 6α,19-dimethyl-$\Delta^4$-10α-pregnene-3,20-dione.
19. 6α-chloro-19-methyl-$\Delta^4$-10α-pregnene-3,20-dione.
20. 6α-fluoro-19-methyl-$\Delta^4$-10α-pregnene-3,20-dione.

References Cited by the Examiner

C. Chen., Tetrahedron 3, pages 43–48 (1958).
Castells et al.: J. Chem. Soc., pages 2627–2639 (1960).
Mayor et al.: J. Chem. Soc., pages 2792–2800 (1960).
Mayor et al.: J. Chem. Soc., pages 2800–2802 (1960).
Rappoldt et al.: Recueil des Travaux Chimiques des Pays-Bas, January (1961), pages 43–46.
Westerhof et al.: Recueil des Travaux Chimiques des Pays-Bas, September (1961), pages 1048–56.

LEWIS GOTTS, *Primary Examiner.*